May 22, 1934.  G. C. COOK  1,959,345
CINDER OR DUST COLLECTOR
Filed Nov. 27, 1931  3 Sheets-Sheet 1

INVENTOR
George C. Cook
BY
ATTORNEY

May 22, 1934.  G. C. COOK  1,959,345
CINDER OR DUST COLLECTOR
Filed Nov. 27, 1931  3 Sheets-Sheet 2

INVENTOR
George C. Cook
BY
ATTORNEY

May 22, 1934.　　　　G. C. COOK　　　　1,959,345

CINDER OR DUST COLLECTOR

Filed Nov. 27, 1931　　　3 Sheets-Sheet 3

INVENTOR
George C. Cook
BY
ATTORNEY

Patented May 22, 1934

1,959,345

UNITED STATES PATENT OFFICE 1,959,345

CINDER OR DUST COLLECTOR

George C. Cook, Millington, N. J.

Application November 27, 1931, Serial No. 577,474

14 Claims. (Cl. 183—21)

The invention relates to apparatus for the removal of solid matter suspended in or entrained with gases such as those resulting from the combustion of coal and other fuel, and the dust resulting from the operation of cement kilns and ovens which is of a more or less comminuted nature.

It has for a general object the provision of a novel apparatus of this character whereby a stream of gas carrying the solid particles may be substantially freed from the entrained matter, the solid matter being trapped by dropping into a liquid upon which the gas is caused to impinge.

In a prior application for Letters Patent of the United States, filed by me November 15, 1929, Serial No. 405,593, I have disclosed apparatus for this purpose and embodying a tank containing liquid, the said tank being associated with a separator casing interposed between an inlet duct conveying the gas current to be cleansed and an outlet duct for the cleansed gas.

The interposed separator comprises a plurality of adjacent compartments in juxtaposed relation to the said ducts, alternate compartments being in communication with and out of communication with each of said ducts to form alternate passageways, all of which open to the said tank and are unobstructed longitudinally. Provision is further made in this apparatus, as by installing transverse partitions in the tank adjacent the base of the separator and with lower edges thereof dipping into the liquid of the tank, to prevent any undue surges of the liquid therein.

It is a further object of the invention to provide means for maintaining these plates free and clear of any deposits of the fine cinders or dust which would otherwise tend to collect thereon, particularly immediately above the water-line, and to build gradually up to such an extent as greatly to interfere with the collecting efficiency of the apparatus, and in some cases completely bridging the space between plates.

A still further object of the invention resides in the provision of means for inducing a surface flow toward an overflow vessel, or a skimming effect along the surface, of the liquid between adjacent plates to remove thereby any accumulation of floating cinders or dust; also, in the provision of a seal for the overflow vessel.

A still further object of the invention resides in the provision of a novel arrangement for sluicing the settled-out cinders and dust from the bottom of the tank.

Another object of the invention resides in the provision, particularly when the separator apparatus is operated at high ratings, of means associated with the incoming gaseous medium whereby a finely atomized liquid atmosphere is provided therein ahead of the tank to afford a mist for agglomerating the finest dust particles to larger and heavier masses, the agglomerated heavier masses then being readily removed upon striking the liquid in the tank.

Still another object of the invention contemplates the elimination of the transverse plates entirely and the provision of diverting blades or vanes attached to the lower edges of plates which form the separator compartments, said blades being so curved as to change the direction of flow of the gas from one substantially parallel to the separator plate outlet edges to a direction perpendicular to the liquid contained in the tank.

A still further object of the invention is to so design these blades that the aforesaid perpendicular direction of flow of the gas stream is further altered to a direction substantially perpendicular to the plane of a separator plate, and to throw the gas streams in opposite directions thereby.

Still another object of the invention resides in the provision of a replaceable section of the plates constituting the separator portion of the apparatus and forming the adjacent compartments, the said sections being located along the lower free edges of said plates.

In carrying out the invention, the incoming gas with entrained solid matter is caused to impinge at relatively high velocity against, and in a direction substantially normal to, the surface of a body of liquid such as water and contained in a suitable tank, being then reversed in direction of flow and discharged at a substantially less velocity to reduce the inertia of any escaping particles. Thereby substantially all of the solid matter is delivered to the water, settling out therein to the bottom of the tank and from which it is subsequently removed, as by sluicing the same into a drain. Also, provision may be made at the entrance to the apparatus for agglomerating finer particles of the material.

When transverse plates are employed in the tank, these may be arranged to be cleansed over their exposed surfaces by directing thereto jets of high-pressure liquid. Also, accumulations of the material upon the surface of the liquid in the tank may be prevented by skimming the surface of the liquid therein as by inducing a flow over its surface toward an overflow compartment or vessel, as in the provision of liquid-discharging nozzles suitably moving liquid along the liquid surface and between the said transverse plates. If desirable, provision may be made for maintaining the height or level within the tank substantially constant or causing the same to vary (inversely) with the change in velocity of the gas impinging upon the surface of said liquid.

The nature of the invention, however, will best be understood when described in connection with the accompanying drawings, in which.

Figure 1:
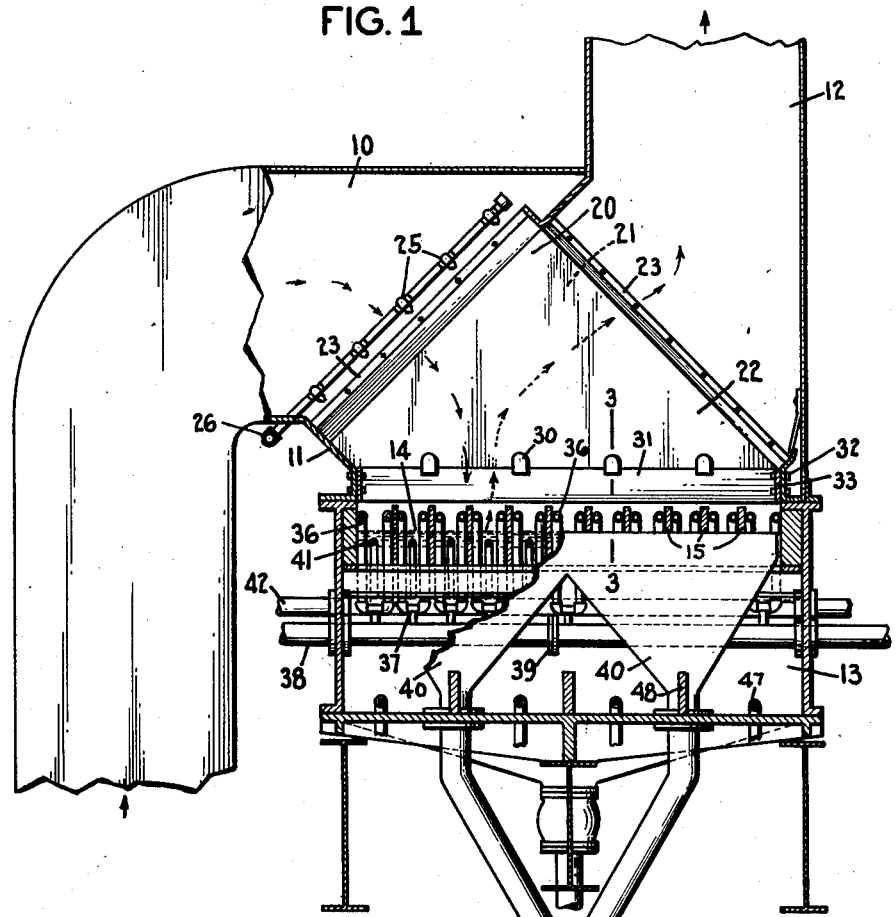
Fig. 1 is a part longitudinal section and part front elevation of the novel cinder or dust collector.

Referring to the drawings, 10 designates a flue or duct for incoming gas such as the gases resulting from the combustion of fuel in the operation of boilers, kilns, ovens, etc., or gases from other sources and containing solid matter suspended therein or entrained therewith. The gas is designed to be led through the duct 10 to a separator member which embodies an enclosing casing 11 from which said gas is eventually discharged through an outlet flue or duct 12 after having been freed of the entrained solid matter.

Casing 11 communicates with a lower or liquid-containing tank or chamber 13 designed to retain a liquid, such as water, to a substantially constant level and which may be automatically maintained constant, or may be conformed to the varying gas velocities, if desired, and as is more particularly set forth in my aforesaid copending application.

It is preferred to have dip into the liquid a series of vertically disposed and transversely arranged plates 15, the bottom edge of each being located always below the water level to prevent undue surges of the liquid within the tank due to the impingement of the gas on the surface, which gas is designed to be delivered at a relatively high velocity and in a direction substantially normal to the liquid 14 and which receives a large proportion of the contained solid material.

For example, casing 11 is divided into a series of alternate narrow and wide longitudinal inlet and outlet passageways 20 and 21, respectively, by adjacently disposed triangular-shaped plates 22, preferably of sheet metal coated with a vitreous enamel. The respective outer edges of the two adjacent plates forming a wide passageway 21 are extended at the entrance portion somewhat beyond the plates to form turned-over flaps 23 which are bent over to overlap and close off at this particular or entrance portion of the casing the wide passageways 21. This will leave a series of successive narrow entrance passageways 20 to the casing for maintaining a high velocity of the incoming gas and alternating with the intermediate closed portions constituted by the flaps 23.

After striking the water surface, the direction of the flow of the gas is designed to be substantially reversed and the gas to this end is directed to the outlet duct 12 through the wider passageways 21. It will be appreciated, also, that as the gas is reversed, after striking the water, it enters the wider passageways 21 and its velocity is thus reduced, assisting the settling out of any remaining solid matter therefrom due to its movement in a direction opposed to the action of gravity and also because its inertia is correspondingly lowered. The course of the gas through the apparatus is thus, as indicated by the arrows, from the duct 10 through the passageways 20 formed between the plates 22 and into the space between the edges of the strips 31 and the surface of the water. Then the flow reverses in direction, the gases passing outwardly between the strips 31 into the alternate passageways 21 formed between said plates 22, and finally to the atmosphere through the outlet flue 12.

In view of the alternate arrangement of these passageways for the gas, an interchange or transfer of heat from the incoming gas to the outgoing gas results which is conducive to the maintenance of the latter above its dew-point.

The solid matter removed by direct impingement as well as that settling out from the outgoing gases is caught in the water, and settles more or less on the bottom of the liquid-containing chamber 13. Extensive tests have shown, however, that at high ratings the efficiency of collection in this manner, for material passing through a 325-mesh sieve, is low.

I have found that the efficiency of collection for such fine material may be greatly improved by setting up at, or introducing at or slightly in advance of, the entrance portion of the separator a fine mist of the liquid employed in the tank, for example water, and for the purpose of agglomerating the finest dust to larger and heavier masses which are to be removed upon striking the water. For example, there may be introduced to the duct 10 immediately in advance of the inlet passageways 20 corresponding series of spray nozzles 25 for atomizing the liquid which will then be drawn into the said passageways 20 as a fine mist. The water for these nozzles may be obtained from a suitable header 26 connected thereto and with a source of supply (not shown).

It has been found in the operation of collector apparatus embodying the plates 22 that the action of the sulfur in furnace gases in combination with the water produces a zone of very intense and active corrosion substantially at the water line and for some distance, approximately six inches above the bottom of the plate, while beyond this point the corrosive action is not very serious.

As a complete plate is relatively expensive and troublesome to replace, I have arranged to render the lower active portion conveniently separable from the main portion of the plate so that it may be readily replaced when it has been attacked to such an extent as no longer to be of use in the apparatus. Thus, a plurality of clips 30 are welded or otherwise suitably secured across the main portion of a plate 22 just above its lower edge and the same are designed to retain in place the removable elongated strip 31 constituting then the lowermost portion of a plate. This strip is further secured at its ends through bolts 32 passing through end flanges 33 of the strip.

As in the previous embodiment set forth in my aforesaid pending application, a succession of transverse plates 15 is provided in the tank 13 with bottom edges located always below the water level 14 to prevent excessive surges of the liquid in the tank. Provision is made, however, for maintaining the surfaces of these plates free from accumulations of fine cinders, dust or other matter thereon, as by providing nozzles 36 adjacent the upper edges and exposed portions of the plates, and which are arranged to direct jets of the liquid at relatively high velocity longitudinally against the surfaces of the plates. These nozzles may be installed as sets of four nozzles, each set being connected through a common connection 37 to a header 38 receiving its supply from a suitable source (not shown). This header, moreover, may be blanked at its intermediate portion 39 in order that one half of the nozzles may be used independently of the other half for intermittent cleaning of the plates at different portions of the tank, the cleaning being effected preferably when the collector is operated with a low gas flow.

It has been found, furthermore, that the cinders in whole or in part will float more or less for a time upon the surface of the liquid in the tank and that the channels formed between the respective plates may eventually become clogged therewith so that the gas cannot impinge directly on the liquid surface. This, of course, lowers the efficiency of the collector; and with high ratings a cinder sludge may even be lifted from the water surface and carried into the outlet duct 12. In order to avoid this occurring, it is necessary to continuously and effectively remove the floating matter; and provision is made to induce a surface flow, or skimming action, of the liquid in the casing.

Thus the water with accumulated separated matter is arranged to be directed to an overflow vessel 40 located approximately at the middle of the casing, the flow being induced, for example, by nozzles 41 directed from opposite ends of the casing through the channels formed between the plates, the nozzles being so located with reference to the surface of the liquid (slightly below the surface) in the casing as to thoroughly skim said surface of any floating matter. A nozzle 41 is therefore installed at each end of the different channels, and liquid is supplied thereto from headers 42 connected to a suitable source of liquid supply (not shown). Make-up water will thereby also continually be admitted to the casing and effects a strong surface flow in each channel to carry off and over into the overflow vessel 40 the material depositing on the surface. As the collector will generally be subjected to a negative pressure or draft above the water level, it becomes necessary to provide a seal, as the trap 43 in the outlet from the overflow vessel 40. Otherwise, the level of the water in the tank might be caused to rise above the desired height, causing both liquid and cinders to be carried into the induced draft fan (not shown) connected with the outlet duct 12.

The cinders accumulating and collected in the tank at the bottom thereof are arranged to be removed intermittently through the opening of valves 45 connected with drain chambers 46 located at opposite ends of the tank. High velocity jets are provided, as from nozzles 47, and as shown are directed toward the drain chambers from the middle portion of the bottom of said tank. Furthermore, it is desirable to provide longitudinal partitions 48 along the bottom of the tank to prevent the liquid from the nozzles from becoming deflected around a pile of cinders and thus not completely clearing the tank.

Figure 3:
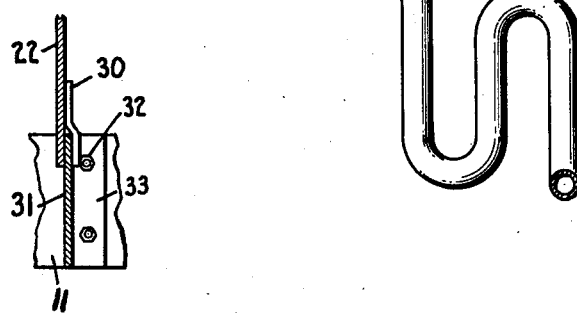
Fig. 3 is a fragmentary transverse section, on an enlarged scale, taken on the line 3—3, Fig. 1 of the drawings.
Figure 2:
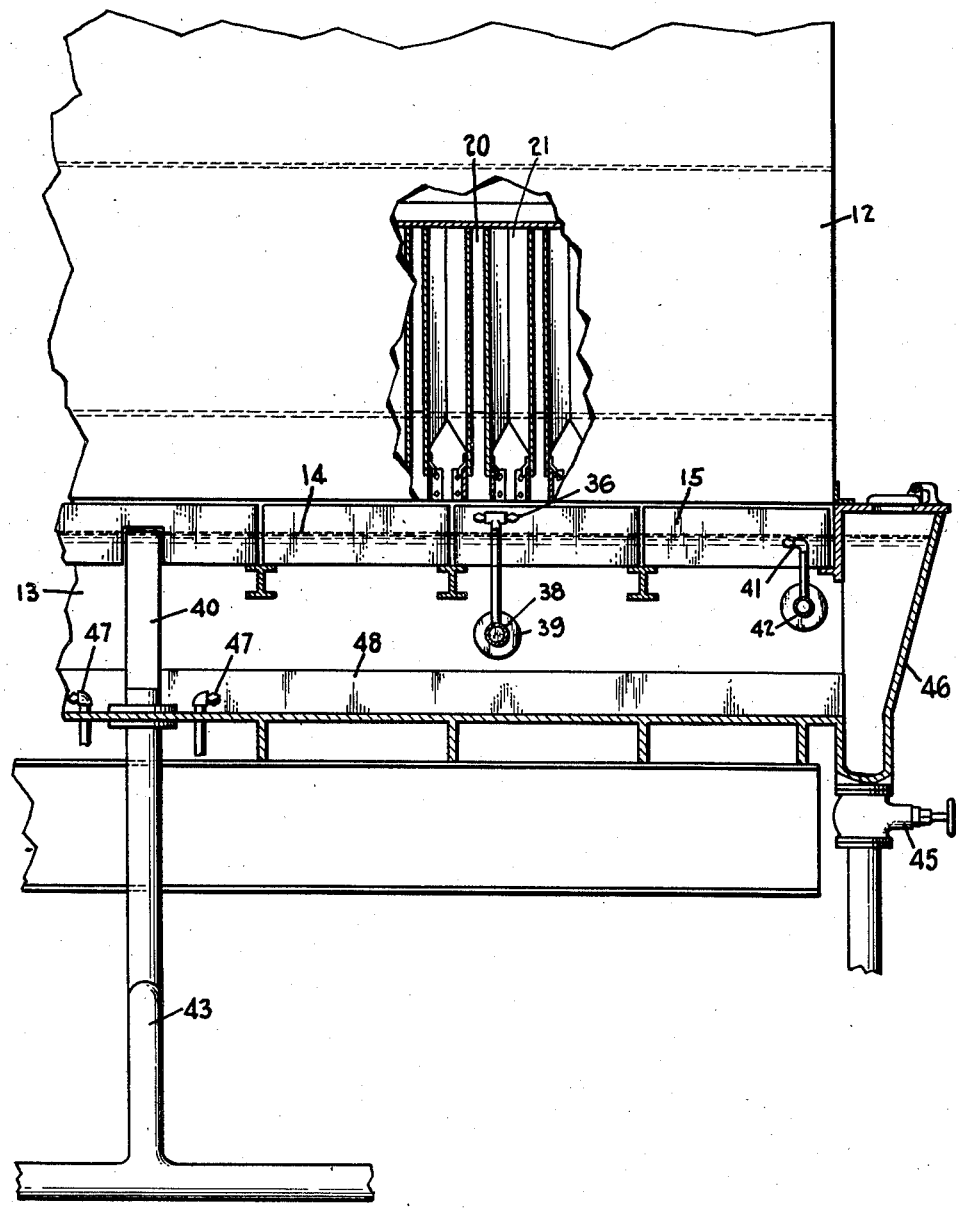
Fig. 2 is a part transverse vertical section and part side elevation of the collector.
Figure 5:
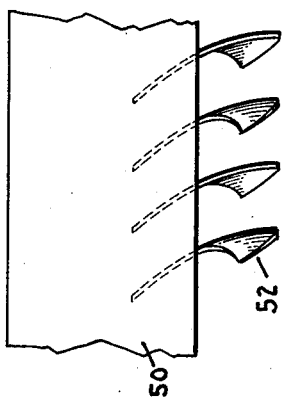
Fig. 5 is a fragmentary elevation, on an enlarged scale.
Figure 6:
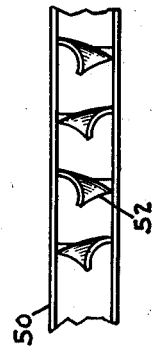
Fig. 6 is a fragmentary underneath view thereof, illustrating in detail the arrangement of the blades shown in the modification, Fig. 4.
Figure 4:
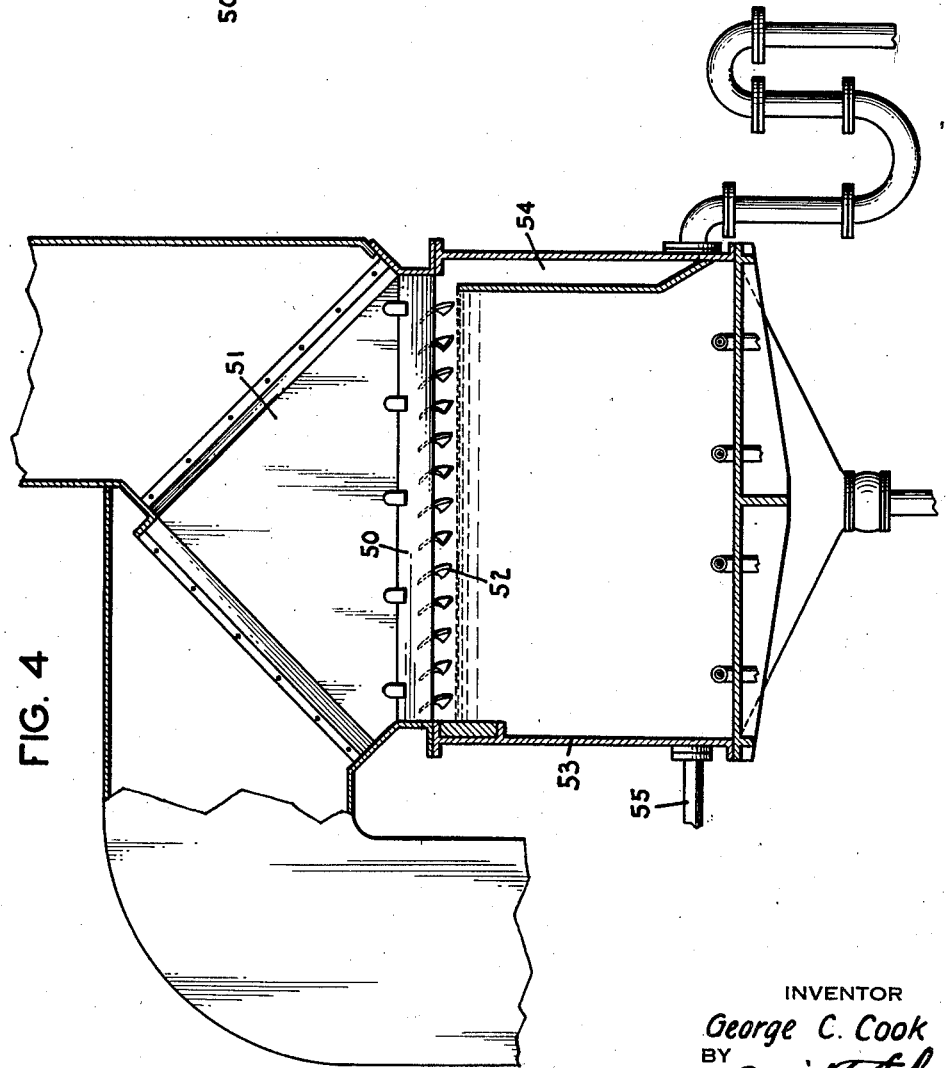
Fig. 4 is a part longitudinal section and part front elevation of the collector, and illustrates a modification therein.

In Figs. 4 to 6, a modification is illustrated in that the plates, hereinbefore described and designed to prevent surges in the liquid, are eliminated. Instead, there is attached, as by welding, to the removable elongated strips 50 of the various plates 51 a succession of deflecting vanes or blades 52. These vanes are so designed and are given such a curvature that the direction of the inflowing gases will be changed from one substantially parallel to the outlet edges of a plate 51 to a direction substantially perpendicular to the liquid of the tank 53. The flows of the gases in this embodiment are otherwise substantially the same as in the collector illustrated in Figs. 1-3 except that in discharging into the space over the water they first impinge upon the said blades 52 and which are located only at the outlet of the inlet passageways.

Furthermore, one of the lower corners of a blade or vane is bent to further direct a gas stream from the vertical direction to a substantially horizontal direction and perpendicularly to the plane of a plate 51. In assembling the blades, the same are so arranged on a plate then that alternate ones divert the gas streams to opposite sides of the plate, as is more particularly shown in Fig. 6 of the drawings. If the blade curvature is made such that the gas streams are directed slightly toward the one end of the tank 53 where there is provided also the overflow chamber 54, then such blades may also be utilized to effect a skimming action upon the surface of the liquid in the tank, causing the make-up water fed thereto through the inlet 55 to be carried to and over into the said overflow chamber 54 for skimming the surface of the water of any floating material.

I claim:

1. The combination with apparatus for trapping particles in suspension in a gas current and embodying a tank containing liquid, an inlet duct conveying said current and an outlet duct for the cleansed gas, and an interposed separator casing comprising a plurality of adjacent compartments in juxtaposed relation to the said ducts with alternate compartments in communication with and out of communication with each of said ducts to form alternate passageways all of which open to said tank, and means to maintain the level of liquid within the tank substantially below the bottom of the passageways; of means located substantially at the inlets to the alternate compartments for providing a mist of liquid to agglomerate fine particles of suspended matter.

2. The combination with apparatus for trapping particles in suspension in a gas current and embodying a tank containing liquid, an inlet duct conveying said current and an outlet duct for the cleansed gas, an interposed separator casing comprising a plurality of adjacent compartments in juxtaposed relation to the said ducts with alternate compartments in communication with and out of communication with each of said ducts to form alternate passageways all of which open to said tank, and transverse partitions in said tank adjacent the base of the separator with the lower edges of said partitions dipping into the liquid of the tank; of means located substantially at the inlets to the alternate compartments for providing a mist of liquid to agglomerate fine particles of suspended matter.

3. The combination with apparatus for trapping particles in suspension in a gas current and embodying a tank containing liquid, an inlet duct conveying said current and an outlet duct for the cleansed gas, an interposed separator casing comprising a plurality of adjacent compartments in juxtaposed relation to the said ducts with alternate compartments in communication with and out of communication with each of said ducts to form alternate passageways all of which open to said tank, and transverse partitions in said tank adjacent the base of the separator with the lower edges of said partitions dipping into the liquid of the tank; of means associated with the individual transverse partitions for directing liquid jets to the sides thereof.

4. The combination with apparatus for trapping particles in suspension in a gas current and embodying a tank containing liquid, an inlet duct conveying said current and an outlet duct for the cleansed gas, an interposed separator casing comprising a plurality of adjacent compartments in juxtaposed relation to the said ducts with alternate compartments in communication with and out of communication with each of said ducts to form alternate passageways all of which open to said tank, and transverse partitions in said tank adjacent the base of the separator with the lower edges of said partitions dipping into the liquid of the tank; of sets of pairs of nozzles located upon opposite sides of the partitions to direct jets of liquid to the sides thereof.

5. The combination with apparatus for trapping particles in suspension in a gas current and embodying a tank containing liquid, an inlet duct conveying said current and an outlet duct for the cleansed gas, and an interposed separator casing comprising a plurality of adjacent compartments in juxtaposed relation to the said ducts with alternate compartments in communication with and out of communication with each of said ducts to form alternate passageways all of which open to said tank and the cross-sectional area of the passageways connected to the inlet duct being less than that of the passageways connected to the outlet duct, and means to maintain the level of liquid within the tank substantially below the bottom of the passageways; of means to direct jets of liquid substantially along the surface of the liquid therein.

6. The combination with apparatus for trapping particles in suspension in a gas current and embodying a tank containing liquid, an inlet duct conveying said current and an outlet duct for the cleansed gas, an interposed separator casing comprising a plurality of adjacent compartments in juxtaposed relation to the said ducts with alternate compartments in communication with and out of communication with each of said ducts to form alternate passageways all of which open to said tank, and transverse partitions in said tank adjacent the base of the separator with the lower edges of said partitions dipping into the liquid of the tank; of means to direct jets of liquid substantially along the surface of the liquid therein and between the said partitions.

7. The combination with apparatus for trapping particles in suspension in a gas current and embodying a tank containing liquid, an inlet duct conveying said current and an outlet duct for the cleansed gas, an interposed separator casing comprising a plurality of adjacent compartments in juxtaposed relation to the said ducts with alternate compartments in communication with and out of communication with each of said ducts to form alternate passageways all of which open to said tank, and transverse partitions in said tank adjacent the base of the separator with the lower edges of said partitions dipping into the liquid of the tank; of means located substantially at the inlets to the alternate compartments for providing a mist of liquid to agglomerate fine particles of suspended matter, and means to direct jets of liquid substantially along the surface of the liquid therein and between adjacent partitions.

8. The combination with apparatus for trapping particles in suspension in a gas current and embodying a tank containing liquid, an inlet duct conveying said current and an outlet duct for the cleansed gas, and an interposed separator casing comprising a plurality of adjacent compartments in juxtaposed relation to the said ducts with alternate compartments in communication with and out of communication with each of said ducts to form alternate passageways all of which open to said tank; of a drain in association with the tank, a series of parallel guide plates disposed adjacently longitudinally over the bottom of the tank toward the drain, and flushing nozzles located between the plates opposite the said drain for directing streams of liquid with flushed matter over the bottom of the tank and toward said drain.

9. Apparatus for trapping particles in suspension in a gas current, comprising a tank containing liquid, an inlet and an outlet duct for the cleansed gas, an interposed separator casing comprising a plurality of plates adjacently disposed parallel to each other longitudinally of the flow of the gas, forming adjacent compartments in juxtaposed relation to the ducts, with alternate compartments in communication with and out of communication with said ducts, and longitudinal strips along the lower free edges of said plates, and clamping means to removably secure the strips to the plates and effect a seal therebetween, the alternate passageways all opening to said tank, and means to maintain the level of liquid within the tank substantially below the bottom of the passageways.

10. Apparatus for trapping particles in suspension in a gas current, comprising a tank containing liquid, an inlet and an outlet duct for the cleansed gas, an interposed separator casing comprising a plurality of plates adjacently disposed parallel to each other longitudinally of the flow of the gas, forming adjacent compartments in juxtaposed relation to the ducts, with alternate compartments in communication with and out of communication with said ducts, and longitudinal strips removably secured to the lower free edges of said plates, the alternate passageways all opening to said tank, and partitions in said tank adjacent the lower edges of the strips and positioned transversely thereto.

11. Apparatus for trapping particles in suspension in a gas current, comprising a tank containing liquid, an inlet and an outlet duct for the cleansed gas, an interposed separator casing comprising a plurality of plates adjacently disposed parallel to each other longitudinally of the flow of the gas, forming adjacent compartments in juxtaposed relation to the ducts, with alternate compartments in communication with and out of communication with said ducts, alternate passageways all opening to said tank, and means to maintain the level of liquid within the tank substantially below the bottom of the passageways, and means carried by the plates along their free edges above the liquid in the tank for diverting the direction of flow of the incoming streams of gas in a direction normal to the surface of the liquid.

12. Apparatus for trapping particles in suspension in a gas current, comprising a tank containing liquid, an inlet and an outlet duct for the cleansed gas, an interposed separator casing comprising a plurality of plates adjacently disposed parallel to each other longitudinally of the flow of the gas, forming adjacent compartments in juxtaposed relation to the ducts, with alternate compartments in communication with and out of communication with said ducts, alternate passageways all opening to said tank, and means carried by the plates along their free edges above the liquid in the tank for directing the flow of the incoming streams of gas in a direction normal to the surface thereof and then to deflect the streams in a direction normal to the plane of a plate.

13. Apparatus for trapping particles in suspension in a gas current, comprising a tank containing liquid, an inlet and an outlet duct for the cleaned gas, an interposed separator casing comprising a plurality of plates adjacently disposed parallel to each other longitudinally of the flow of the gas, forming adjacent compartments in juxtaposed relation to the ducts, with alternate compartments in communication with and out of communication with said ducts, alternate passageways all opening to said tank, and means carried by the plates along their free edges above the liquid in the tank for directing the flow of the incoming streams of gas in a direction normal to the surface thereof and then to deflect the streams in a direction normal to the plane of a plate, and alternate blades diverting the last-named flows in opposite directions.

14. Apparatus for trapping particles in suspension in a gas current, comprising a tank containing liquid, an inlet and an outlet duct for the cleansed gas, an interposed separator casing comprising a plurality of plates adjacently disposed parallel to each other longitudinally of the flow of the gas, forming adjacent compartments in juxtaposed relation to the ducts, with alternate compartments in communication with and out of communication with said ducts, longitudinal strips removably secured to the lower free edges of said plates, the alternate passageways all opening to said tank, and means carried by the strips for directing the flow of the incoming streams of gas in a direction normal to the surface of the liquid within the tank.

GEORGE C. COOK.